Oct. 27, 1970   J. R. LUCAS   3,536,536
STORAGE BATTERY SYSTEM WITH ELECTROLYTE
IN A SEPARATE CONTAINER
Filed July 8, 1968

INVENTOR.
John R. Lucas
BY Hood, Herron & Evans
ATTORNEYS

United States Patent Office 3,536,536
Patented Oct. 27, 1970

3,536,536
STORAGE BATTERY SYSTEM WITH ELECTROLYTE IN A SEPARATE CONTAINER
John R. Lucas, Carthage, Mo., assignor to Eagle-Picher Industries, Inc., Cincinnati, Ohio, a corporation of Ohio
Filed July 8, 1968, Ser. No. 743,069
Int. Cl. H01m 21/00
U.S. Cl. 136—114                                    6 Claims

ABSTRACT OF THE DISCLOSURE

A completely enclosed, constant volume system for a dry state storage battery that protects the cells and electrolyte from surrounding environmental conditions during storage of the battery system and during activation of the cells, and permits those cells to be readily filled with electrolyte when activation is desired. The system, in preferred operational form, includes a flexible walled, electrolyte filled bottle united with an electrolytic cell. Under storage conditions the inner environment of the bottle is separated from the inner environment of the cell by a rupturable membrane that closes the bottle's mouth or spout. When activation of the cell is desired the membrane is ruptured by manually manipulating the bottle relative to the cell, without disengaging the bottle from the cell, so as to slice that membrane with a knife edge mounted in the cell's inlet port. Electrolyte can then flow and/or be squeezed from the bottle into the cell to make the cell operational. Such a system is ideal for numerous uses either at ground level or in outer space as there is no possibility of electrolyte spillage, fouling of the battery with foreign matter, or the like during storage or during activation because the system remains completely enclosed, that is, at a constant volume, at all times. Such a system is also highly advantageous for outer space uses because it is easy and simple to operate under vacuum and/or zero gravity conditions when activation is desired.

---

This invention relates to storage batteries and, more particularly, relates to an improved method and apparatus for activating dry state storage batteries.

A battery can be generally defined as a couple of any two different metals which, when immersed in an electrolyte, delivers an electric current. Many different metal couple systems are known from which operational batteries can be formed. Generally speaking, batteries belong to one of two classes, namely, primary or secondary; however, batteries formed of certain metal couples can be made so as to fall in either classification. The primary storage battery is constructed to give only one discharge and normally is not capable of being recharged. On the other hand, the secondary storage battery is capable of being charged, discharged, and recharged many times.

Generally speaking, batteries of both the primary and secondary type may be manufactured so that they can be shipped and/or stored in one of two conditions, namely, the wet state or the dry state. The designation of wet state or dry state, as it is known in the art, refers to the presence or absence of electrolyte in operating relationship with the metal couple or battery plates in the battery's electrolytic cells. With regard to wet state batteries, a battery in the wet charged condition is one which has been manufactured and delivered to the user filled with electrolyte and in the charged state, in other words, ready for immediate use. Unfortunately, a wet charged battery will lose its charge on standing because of a factor called self-discharge; also, the electrolyte will cause a slow decay of the battery's component parts. Therefore, the shelf or storage life of wet charged batteries is relatively poor. When a battery is fabricated in the wet state, it is almost always delivered in the wet uncharged condition because the component parts are better preserved than when the battery is delivered in the wet charged condition. However, the wet uncharged battery must be charged prior to use and such charging may require substantial time.

It is highly preferred that batteries be shipped in the dry state, particularly if they are to be stored for a period of time before use, because the shelf life of dry state batteries is relatively long. A dry charged battery is one that is manufactured from plates in a charged but dry state and is capable of delivering current substantially immediately upon filling with electrolyte. The main advantage of a dry charged battery is its capability of substantial shelf life without deterioration. With a dry charged battery the electrolyte is stored separately from the battery cells and, when the user desires, the electrolyte is transferred into the cells by pouring from a separate container to activate the battery for service. The dry charged battery becomes usable as a power source as soon as the electrolyte is added. Batteries are also made and shipped in the dry but uncharged state. With such a dry uncharged battery, electrolyte must be added and the battery subjected to a complete charge prior to service in order for the battery to be activated. The advantage of shipping in this condition is to obtain extremely long storage life without decay of parts. Also, a battery of this type can be offered at a lower price since the cost of manufacture is less.

The electrolyte is a most important part of a battery system; depending on the type of battery, the electrolyte may be an alkaline or an acid solution. In substantially all dry state battery systems the amount and/or strength of the electrolyte is a critical factor in the ultimate operation of the battery. Careful control in adjusting the strength and in measuring the amount of electrolyte to be added to each cell is usually required. For example, an improper volume of electrolyte can starve or flood the battery's cells and adversely affect its capacity. Care must be taken in mixing and handling most electrolytes while adding to the battery cells since contact with the skin can cause blistering, accidental contact with eyes can be damaging as well as painful, and clothing can be ruined.

A dry state battery, that is, one where electrolyte must be added to the cells when it is desired to make the battery operational, that is constructed and activated properly is a pretty tough piece of equipment but, unfortunately, it is also delicate in some respects. Problems of a practical nature are presented under certain field conditions when it is attempted to activate the dry state battery by adding electrolyte to its cells. These problems are particularly acute under circumstances such as military field uses, outer space uses, and the like where the surrounding environmental conditions are not conducive to careful handling of electrolyte. For example, very small amounts of certain impurities can render some types of batteries useless regardless of how well they are designed and constructed. In general, most all metal impurities are damaging to a cell's negative plates while nonmetal impurities are harmful to a cell's positive plates. Metal impurities will usually dissolve in the electrolyte and then deposit on the negative plate material where a local couple is set up causing the plate to self-discharge. Nonmetal impurities usually affect the positive plate by causing grid corrosion or acting to dissolve the positive plate material. Obviously, it is important to guard against contamination of the inside of a cell for the damaging of one cell in this manner could cause an entire battery to be defective. Also, under certain operational conditions, for example, outer space, where a vacuum and/or zero gravity environment may be present it is substantially impossible to pour electrolyte from a separate container into the cells of a battery. Not only would such pouring be made extremely difficult under zero gravity conditions, but the bulkiness of a spaceman's outer garments also adds to the overwhelming difficulty in the measuring and pouring of the electrolyte into the cells.

Thus, it has been one objective of this invention to provide a system for a dry state battery that can be easily and simply operated, that is, a completely enclosed system of constant volume, to obviate spilling and contaminating the electrolyte during storage and when activation is desired.

It has been another objective of this invention to provide a system for a dry state battery that can be readily activated under zero gravity conditions and/or under vacuum conditions, as well as can be readily activated at ground level.

It has been another objective of this invention to provide a system for a dry state battery that can be operated when the battery is in substantially any orientation.

These objectives have been obtained by providing a battery comprising, in combination and in preferred form, (a) a cell having an internally threaded port opening into the cell and a knife blade extending from the cell casing into the port area, and (b) a flexible electrolyte container having an externally threaded spout partially screwed into the port and a rupturable membrane normally closing the spout during storage but being engageable by the knife blade as the spout is further screwed into the port so the electrolyte can flow into the cell when activation is desired. A pressure relief valve is carried by the container and is insertable into the container after rupturing the membrane to permit degassing of the cell during operation of it as a power source.

Other objectives and advantages of this invention will be more apparent from the following detailed description taken in conjunction with the drawings in which.

Figure 1:
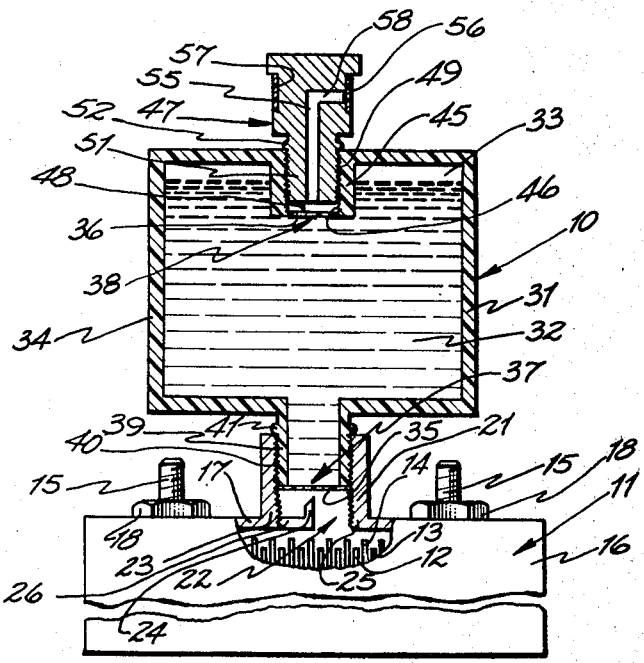
FIG. 1 is a partially broken away, partially cross-sectional view of the battery system of this invention illustrated for a single battery cell, the system being in the storage attitude.

FIG. 1 depicts an electrolyte bottle or container 10 affixed or united with an electrolytic cell 11. It will be understood that a series of such container 10-cell 11 combinations may be provided in an outer casing, not shown, to establish a battery, the number of such combinations required being dependent on the available voltage per cell of the metal couple-electrolyte system used and the overall voltage output desired of the battery. For example, if each cell is rated at 1.8 volts and a 9 volt battery is desired, five such cells must be placed in series to establish the battery system.

The electrolytic cell 11 includes a series of negative plates 12 and a series of positive plates 13 separated one from the other by bibulous separators 14. The positive plates 13 are soldered together and the negative plates 12 are soldered together at junctions, not shown, with a terminal post 15 being provided for each of the two groups. The positive and negative plate groups, separted by the separators 14, are then interleaved together and inserted into the cell case 16. The material from which case 16 is fabricated must provide sufficient structural strength for the case to withstand the pressures (both internal of and external to the cell 11) that will be present in its ultimate operating environment. The terminal posts 15 exend upwardly out of the top 17 of the cell case 16, the top being fixed to the case to form a closed inner environment for the cell. A nut 18 is threaded over each terminal post 15 into engagement with the top 17 of the case 16 to aid in maintaining the positive plate-negative pltae-separator combination in a rigid and fixed attitude within the cell case.

The cell case 16 is provided with first joint means in the form of an annular sleeve 21 molded integral with the case's top that defines an inlet port 22. The internal circumference of the sleeve 21 is threaded, as at 23. Membrane rupturing means in the form of a knife blade 24 extends out into the center of the port 22 toward the bottom 25 of the sleeve 21, the knife blade being affixed to the top 17 of the casing 16 through an arm 26. The cell case 16 is completely dry during storage of it, that is, no electrolyte is present within the inner environment of the cell 11, and it is sealed off from surrounding environmental conditions, that is, it is completely enclosed, by container 10 being received in (thereby closing off) the port 22 as is illustrated in FIG. 1. The inner environment of the cell 11 will normally be at atmospheric pressure because the system is fabricated at ground level, but the pressure may be greater than or less than atmospheric if desired.

The electrolyte container 10 is in the form of a flexible sided 31 squeeze bottle and, as fabricated, is united with the cell 11. The material from which the bottle 10 is fabricated must provide sufficient structural strength for the bottle to withstand the pressure (both internal of and external to the bottle 10) that may be present in its ultimate operating environment. The bottle 10 is provided with a supply of electrolyte 32 that substantially fills the inside of the container, an air gap or air bubble 33 being maintained within the container after filling. The bottle 10 is sized to hold only that amount of electrolyte 32 required for the cell 11 plus the air bubble 33.

The bottle 10 is completely sealed or enclosed when in the storage attitude, see FIG. 1, as witnessed by the integral sides 34 and rupturable membranes 35, 36 sealed over the mouth 37 and gas release port 38 of the container. The mouth 37 of the container is defined by second joint means in the form of a spout 39 having threads, as at 40, on its outer periphery. The spout 39 is sized to threadedly engage the sleeve 21 of the cell case 16, thereby providing an integrated and entirely enclosed, constant volume battery system. The spout 39 is threaded into the sleeve 21 a substantial distance during fabrication, as illustrated in FIG. 1, but is preliminarily stopped from further movement by stop means or bosses 41 that engage the top of the sleeve 21 so that the knife blade 24 does not engage the rupturable membrane 35 during manufacture, thereby positioning the spout 39 relative to the sleeve 21 for storage purposes.

The electrolyte bottle 10 is also configured to provide a well 45 integral with its sides 34 in line with the spout 39, thereby providing the inlet port 22 of the cell 11 and the mouth 37 and gas release port 38 of the bottle 10 on a common line. The well 45 is threaded, as at 46, on its inner periphery and the membrane 36 is sealed to the bottom of the well. A T-shaped relief valve 47 that mounts a knife blade 48 on its bottom end is threaded, as at 49, on its stem portion 51 and the stem is threadedly engaged with the well 45. The stem 51 of the valve 47 is screwed into the well 45 only to the extent that, during storage of the system, the knife blade 48 does not engage the rupturable membrane 36 at the bottom of the well, see FIG. 1. Positioning of the valve stem 51 in the well 45 during manufacture and storage is aided by bosses 52 on that stem. The relief valve 47 is provided with a central coduit 55 extending up through the center and exiting from the side of the valve in a right angular configuration. A neoprene or otherwise flexible ring 56 is received in a peripheral recess 57 disposed at the top of the valve outside the bottle 10, the ring covering the outlet port 58 of the conduit. The flexible ring 56 is sized to control the pressure within the bottle 10 when the membrane 36 is ruptured, for example, the tighter the ring is about the stem 51 the higher the relief pressure setting for the valve 47.

Thus, in the as manufactured and storage attitude, the dry state battery system of this invention is as illustrated in FIG. 1. The inside of the cell 11 is completely closed to the surrounding environment because the electrolyte filled bottle 10 is screwed into engagement therewith, the membrane 35 closing inlet port 22. This prevents moisture and other impurities from penetrating into the cell 11 and, thereby, shortening the cell's storage or shelf life, it being know that moisture is particularly detrimental to dry charged storage battery cells. Of course, the electrolyte 32 also is maintained completely separate and apart from the cell's positive and negative plates by means of the membrane 35 over the mouth 37 of the bottle 10. The electrolyte is thereby completely protected from the surrounding environment so that contamination and the like cannot in any way reach the electrolyte. Also, the amount and strength of the electrolyte 32 is proper and adequate for the cell 11 involved because it has been so measured and supplied to the bottle 10 during manufacture under ideal conditions, thereby eliminating this problem when activation is desired. The air bubble 33 established in the bottle 10 permits the electrolyte to expand or contract as the environment temperature dictates without unduly stressing the bottle configuration and membranes 35, 36 sealingly engaged therewith. The size of the bubble 33 may be varied as desired, the thinner the bottle walls 31 the greater the volume of the air bubble desired and vice versa.

In manufacturing the activation system, there is first provided an electrolytic cell 11 having a port 22 into the cell environment, that port being provided with a knife blade 24 or other membrane rupturable means. Secondly, there is provided a completely closed and sealed electrolyte container 10, the container being provided with a rupturable membrane 35 on that portion of it to be mated or united with the port 22 of the cell casing 16. The bottle 10 and cell 11 are then engaged or affixed together, thereby completely closing the cell 11 to the outside environment, too. The cell 11 and bottle 10 are held together to form an integral system by the first and second joint means, that is, the threaded spout 39 and the threaded sleeve 21, thereby permitting the bottle to be manipulated or moved relative to the container. The system is shipped and stored in this attitude, that is, with the electrolyte container 10 united with the battery cell 11, so as to provide a completely enclosed, closed volume system that is always ready for quick and easy activation. Preferably a pressure release valve 47 having a knife edge 48 on its bottom end is also affixed to a gas release port 38 in the electrolyte container, the knife being egageable when desired with the rupturable membrane 36 provided in that gas release port for storage purposes.

Figure 2:
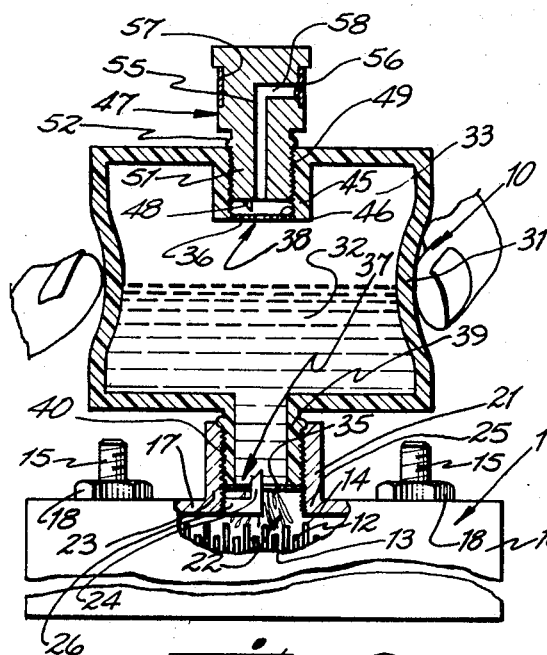
FIG. 2 is a view similar to FIG. 1 illustrating the cell's activation by adding electrolyte to the cell.
Figure 3:
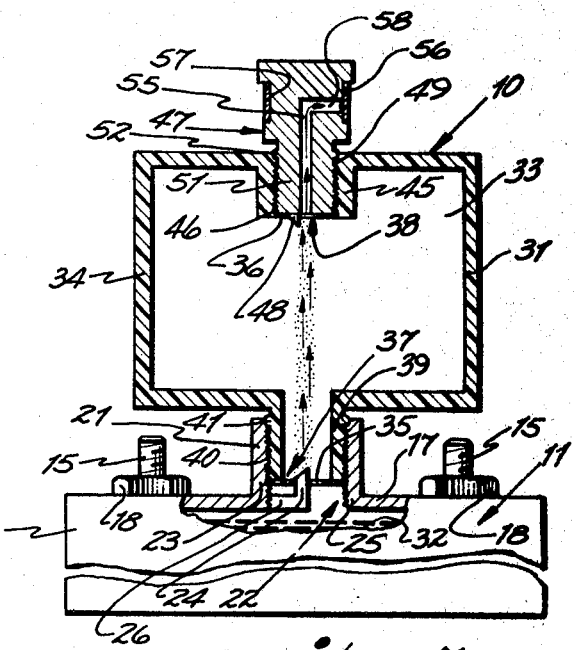
FIG. 3 is a view similar to FIGS. 1 and 2 illustrating venting of the cell once it has become operational.

To activate the cell 11, and as illustrated in FIG. 2, the electrolyte bottle 10 is manipulated relative to the cell, without disengaging the bottle from the cell, by further screwing the bottle down into the sleeve 21 of the cell casing 16 and overcoming the bosses 41 so that the knife blade 24 affixed to casing top 17 engages and ruptures the rupturable membrane 35 in the mouth 22 of the bottle. At this point electrolyte 32 flows from the bottle 10 into the cell environment. If the cell 11 is being used under zero gravity conditions or in an upside down attitude it probably will be necessary to squeeze the flexible sides 31 of the bottle 10 to force the electrolyte 32 into the cell. As mentioned, preferably the separators 14 are made of a bibulous material so that they will absorb the electrolyte as it is forced into the cell, thereby preventing the electrolyte from flowing back into the bottle 10. No spilling is possible nor is contamination of either the cell 11 environment or the electrolyte 32 possible because the system is a completely enclosed, constant volume system. Such a system is extremely easy to use or operate because the bottle 10 need only be rotated two or three turns, depending on the thread 23, 40 characteristics, until the knife blade 24 ruptures the membrane 35. Such a simplicity of operation is extremely important under certain operating circumstances such as, for example, in space where an individual is under stress and cannot be subjected to complex duties.

Thus, the electrolyte 32 from the bottle 10 displaces the atmosphere, if any, within the cell 11. Once the electrolyte 32 has been forced into the cell 11, activation of the battery takes place and the battery springs to life if the cell is of the dry charged type. Gases are usually generated from the positive 13 and negative 12 plates of the cell 11 during its operation, no matter what type metal couple-electrolyte system is used, and facilities generally need to be provided for release of such gas pressure. Therefore, after the electrolyte 32 has been transferred into the cell environment, the pressure relief valve 47 is manipulated relative to the bottle 10 by screwing the valve down past bosses 52 so that the knife edge 48 carried at the bottom of the valve ruptures the membrane 36 sealed to the bottom of the well 45 within which the valve is positioned. Once the membrane 36 is ruptured, conduit 55 then permits escape of the gases generated within the cell 11 through the side port 58 into the surrounding environment for efficient operation of the cell. If membrane 36 is ruptured by relief valve 47 prior to filling the cell 11, and if the outside environmental pressure were less than the pressure within the cell, electrolyte may tend to exhaust from the valve 47 during the filling step. Also, flexing of the bottle sides 31 may tend to force electrolyte out through valve 47 if membrane 36 is ruptured prior to delivering all electrolyte 32 to the cell 11.

As mentioned, it is preferred that the electrolyte bottle 10 be made of a flexible material so that the walls 31 of that container can be flexed if needed to force the electrolyte 32 from the container into the cell under certain operating conditions. The flexible wall container 10 may be fabricated of, for example, polyethylene, polypropylene, rubber compositions resistant to the electrolyte used in the system, and the like. The rupturable membranes are preferably of the same material but of less thickness than the walls 31 so they may be readily sliced by the knife blades 26, 48. The cell casing 16, as well as the flexible wall container 10, must both be rugged enough, that is, thick enough, to be able to be used in a vacuum (for example, outer space) if such is the environment in which the system is to be used. This for the reason that the battery will have been fabricated generally at around sea level and, therefore, the inside of the electrolyte container and the inside of the cell casing will be substantially at sea level pressure. Consequently, the wall thickness both of the cell 11 and of the bottle 10 must be sufficient so that the system does not "explode" when it is subjected to very low pressures. It is preferred that the cell casing be substantially square in geometric configuration and it is preferred that the electrolyte container be substantially cylindrical in geometric configuration because it has been found that such structural configurations provide the optimum in strength and in storage space savings.

The invention has been illustrated in conjunction with a single cell 11, that cell being provided with its own electrolyte container 10, and it will be apparent to those skilled in the art that a series of such combinations may be linked together to provide the output voltage desired under the required operating circumstances. As an alternative structure, when a series of cells 11 is required to achieve the desired voltage it is within the scope of this invention to provide a manifold relating the inner environment of each cell 11 to a single electrolyte container. A rupturable membrane separates the container from the manifold to enclose completely the cells from the atmosphere when the container is partially engaged or united with the manifold. A knife edge is provided in the manifold to rupture the membrane when the container is fully engaged with the manifold, that is, is manipulated relative to the manifold. Thus, if five cells 11 are placed in series only one container 10 is necessary as opposed to five electrolyte containers if each cell is provided with its own electrolyte container.

This invention is particularly useful with a silver-zinc type of electrolytic cell because of the unique characteristics of that type of cell. The silver-zinc cell may be built for and used as either a primary battery or as a rechargeable secondary battery. The general chemical and electrolytic principles of this type cell have long been known and the theoretical aspects investigated experimentally, but actual service batteries constituted by such cells were not readily available commercially because of the many serious practical difficulties involved in quantity production until the invention embodies in U.S. 2,727,083. Thus, U.S. 2,727,083 completely discloses and sets forth a silver-zinc electrolytic cell of the type found quite useful in conjunction with the battery system of this invention.

As a matter of theory, the silver-zinc may be as much as three times as efficient as the standard lead-acid battery on the basis of electrical power (watt-hours) delivered per unit of battery weight. This favorable power to weight ratio is manifestly desirable for many uses, among which provision of current for airborne or outer space electrical equipment is typical. From the viewpoint of producing a battery which is of the lightest possible weight in relation to capacity, the quantity of electrolyte required for the cells is also a consideration of importance. In a silver-zinc battery, no great quantity of electrolyte is required and it is, therefore, convenient and expedient to engage the electrolyte with the cell plates by holding the electrolyte on bibulous electrode separators, these separators also providing insulation between the plates. By using relatively thin electrodes, sufficient electrolyte to exhaust their active chemicals may be placed on a pad between them which is not sufficiently thick to unduly elevate the internal resistance of the cell. It is often desirable further to insulate the cell electrodes to prevent short circuiting and this may be done by using a dielectric membrane in place of or in addition to the bibulous padding. As mentioned, such a cell structure is more particularly described in U.S. 2,727,083.

Other modifications to the preferred structure and method of this invention will be apparent to those skilled in the art; the scope of this invention is intended to be limited only as defined in the appended claims. Having completely and fully described the preferred embodiment of my invention, what I desire to claim and protect by Letters Patent is:

1. A completely enclosed, constant volume storage battery system for a dry state storage battery, said system being adapted for energization through manual operation by the hands of an operator when desired by that operator, comprising, in combination:
   a dry electrolytic cell, said cell having a port opening into the cell casing,
   a container of electrolyte, said container having a mouth so aligned with said port to permit flow of the electrolyte from said container to said cell upon energization of said system,
   joint means for uniting said container and said casing together in operable relation, said joint means permitting manual rotation of said container relative to said casing by an operator's hands after said container and said cell are operably related without disengaging said container from said casing,
   first rupturable membrane means separating the container's inner environment from the cell's inner environment, said first membrane means being fixedly positioned over one of said mouth and said port under storage conditions, and
   first membrane rupturing means fixed relative to the other of said mouth and said port, said first rupturing means being positioned to engage and to rupture said first membrane means upon rotation of said container relative to said cell by the hands of an operator and, thereby, permit said cell to fill with the electrolyte from said container to energize said storage battery system.

2. A system as set forth in claim 1 wherein said joint means comprises:
   a sleeve defining said cell's port and fixed to the cell's casing, said sleeve having either internal or external threads, and
   a spout defining said container's mouth and fixed to said container, said spout having threads adapted to mate with the threads on said cell,
   said threaded sleeve and said threaded spout cooperating to unite said container and said cell together in operable relation by a threaded joint which permits an operator to rotate said container relative to said casing by hand without disengaging said container from said casing.

3. A system as set forth in claim 1 further comprising:
   a gas release port in said container, said gas release port being provided with second rupturable membrane means for separating the inner environment of said container from the atmosphere under storage conditions,
   a pressure relief valve connected to said gas release port, said pressure relief valve being provided with second membrane rupturing means positioned to engage said second rupturable membrane means only during energization of said battery system, and
   second joint means for connecting said valve and said port together in operable relation, said second joint means permitting manual rotation of said valve relative to said port through the hands of an operator after said valve and said port are operable related without disengaging said valve from said port for rupturing said second membrane means to render the inner environment of said container accessible to the atmosphere through said pressure relief valve.

4. A system as set forth in claim 1 wherein said first membrane rupturing means comprises a knife blade mounted to said cell structure so as to extend into said port, and said first rupturable membrane means comprises a thin membrane stretched across and sealingly engaged with the mouth of said container.

5. A system as set forth in claim 1 wherein said container comprises walls adapted to be flexed by the fingers of an operator after rotation of said cell relative to said container has been accomplished for completely exhausting the electrolyte in said container into said cell no matter what the spatial attitude of said storage battery system.

6. A system as set forth in claim 5 wherein said container is fabricated of a material selected from the group consisting of polyethylene, polypropylene and rubber compositions resistant to the electrolyte employed in said system.

References Cited

UNITED STATES PATENTS

| | | | |
|---|---|---|---|
| 2,847,494 | 8/1958 | Jeannin | 136—114 |
| 2,852,592 | 9/1958 | Salauze | 136—113 |
| 3,067,274 | 12/1962 | Heinsohn et al. | 136—90 |
| 3,222,225 | 12/1965 | Amiet et al. | 136—90 |
| 3,304,202 | 2/1967 | Sam | 136—6 |

WINSTON A. DOUGLAS, Primary Examiner

C. F. LE FEVOUR, Assistant Examiner

U.S. Cl. X.R.

136—6, 90